United States Patent
Xu et al.

(10) Patent No.: US 12,229,059 B1
(45) Date of Patent: Feb. 18, 2025

(54) REQUEST PROCESSING METHOD AND APPARATUS, DEVICE, AND MEDIUM

(71) Applicant: Suzhou MetaBrain Intelligent Technology Co., Ltd., Suzhou (CN)

(72) Inventors: Jiangbo Xu, Suzhou (CN); Wendao Mu, Suzhou (CN); Jian Cui, Suzhou (CN); Ruizhen Wu, Suzhou (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 18/718,708

(22) PCT Filed: Sep. 23, 2022

(86) PCT No.: PCT/CN2022/121127
§ 371 (c)(1),
(2) Date: Jun. 11, 2024

(87) PCT Pub. No.: WO2023/201987
PCT Pub. Date: Oct. 26, 2023

(30) Foreign Application Priority Data

Apr. 19, 2022 (CN) .......................... 202210407248.4

(51) Int. Cl.
*G06F 13/16* (2006.01)
(52) U.S. Cl.
CPC ...... *G06F 13/1642* (2013.01); *G06F 13/1673* (2013.01)
(58) Field of Classification Search
None
See application file for complete search history.

(56) References Cited

U.S. PATENT DOCUMENTS 5,889,948 A * 3/1999 Smolansky ........... G06F 9/3879
712/E9.067
6,138,176 A * 10/2000 McDonald ............ G06F 13/124
710/6

(Continued)

FOREIGN PATENT DOCUMENTS

CN 109062826 A 12/2018
CN 109558250 A 4/2019

(Continued)

OTHER PUBLICATIONS

International Search Report of corresponding PCT application (PCT/CN2022/121127) Jan. 17, 2023 including English translation (5 pages).

(Continued)

*Primary Examiner* — Elias Mamo
(74) *Attorney, Agent, or Firm* — Crowell & Moring LLP (57) ABSTRACT

A request processing method, includes: acquiring, from a local first input first output (FIFO) queue, an address of a current request to be processed, and based on the address of the current request to be processed, acquiring the current request to be processed from a preset request buffer area; parsing the current request to be processed, and based on a parsing result, acquiring corresponding current source data to be processed and a serial address item for recording an address of a next request to be processed; processing the current source data to be processed to obtain currently processed target data, and writing the currently processed target data into a preset data buffer area; and notifying a host to read all processed target data from the preset data buffer area when the serial address item is empty.

20 Claims, 6 Drawing Sheets

(56) References Cited

U.S. PATENT DOCUMENTS

| | | | | |
|---|---|---|---|---|
| 7,035,958 B2* | 4/2006 | Augsburg | ........... | G06F 13/4022 |
| | | | | 710/39 |
| 10,489,056 B2* | 11/2019 | Lindholm | ................ | G06F 3/061 |
| 10,713,746 B2* | 7/2020 | Gould | ................... | G06F 9/5016 |
| 11,550,674 B2* | 1/2023 | Govindarajan | ..... | G06F 11/1625 |
| 2019/0286563 A1 | 9/2019 | Swamy et al. | | |

FOREIGN PATENT DOCUMENTS

| | | | |
|---|---|---|---|
| CN | 113010090 A | 6/2021 | |
| CN | 113515320 A | 10/2021 | |
| CN | 114138481 A | 3/2022 | |
| CN | 114244790 A | 3/2022 | |
| CN | 114513545 A | 5/2022 | |

OTHER PUBLICATIONS

Written Opinion of International Searching Authority of corresponding PCT application (PCT/CN2022/121127) Jan. 17, 2023 including English translation (9 pages).

Search report of corresponding CN priority application (CN202210407248.4) May 18, 2022 (1 page).

First Office Action of corresponding CN priority application (CN202210407248.4) May 24, 2022 including English translation (12 pages).

Supplementary search report of corresponding CN priority application (CN20221047248.4) Jun. 6, 2022 (2 pages).

Notification to Grant Patent Right for Invention of corresponding CN priority application (CN202210407248.4) Jun. 14, 2022 including English translation (3 pages).

\* cited by examiner

REQUEST PROCESSING METHOD AND APPARATUS, DEVICE, AND MEDIUM

CROSS-REFERENCE TO RELATED APPLICATION

This application is the national phase application of International Patent Application No. PCT/CN2022/121127, filed Sep. 23, 2022, which claims priority to Chinese Patent Application No. 202210407248.4, entitled "REQUEST PROCESSING METHOD AND APPARATUS, DEVICE, AND MEDIUM", filed to China National Intellectual Property Administration on Apr. 19, 2022. The contents of International Patent Application No. PCT/CN2022/121127 and Chinese Patent Application No. 202210407248.4 are each incorporated by reference in their entireties.

FIELD

The present application relates to the field of management software, and particularly to a request processing method and apparatus, a device, and a medium.

BACKGROUND

In recent years, with the development of mobile Internet, artificial intelligence (AI), and other emerging technologies, the scale of large data and of Internet application are growing exponentially. Services that a data center needs to handle are also growing, and the computing power of general-purpose processors used by the data center has reached a bottleneck. In order to solve this problem, various dedicated computing accelerated peripheral component interconnect express (PCIe) boards on the basis of field programmable gate array (FPGA) and application specific integrated circuit (ASIC) have been developed, such as compress and decompress cards, redundant arrays of independent disks (RAID) memory cards, and well-known general-purpose computing on graphics processing units (GPGPUs) for neural network training derivation. The inventors have realized that since different accelerator cards use different drive interfaces, in the related art, each computing process requires a host to schedule when multiple acceleration computations are required, undoubtedly increasing the burden of a central processing unit (CPU) and reducing the processing efficiency.

In summary, it can be seen that how to reduce the CPU burden and improve the efficiency of request processing is a problem to be solved in the art.

SUMMARY

In a first aspect, the present application discloses a request processing method, applied to a current accelerator card, including:
  acquiring, from a local first input first output (FIFO) queue, an address of a current request to be processed, and based on the address of the current request to be processed, acquiring the current request to be processed from a preset request buffer area;
  parsing the current request to be processed, and based on a parsing result, acquiring corresponding current source data to be processed and a serial address item for recording an address of a next request to be processed;
  processing the current source data to be processed to obtain currently processed target data, and writing the currently processed target data into a preset data buffer area; and
  notifying a host to read all processed target data from the preset data buffer area in response to the serial address item being empty.

In a second aspect, the present application discloses a request processing apparatus, applied to a current accelerator card, including:
  a request acquisition module, configured to acquire, from a local FIFO queue, an address of a current request to be processed, and based on the address of the current request to be processed, acquire the current request to be processed from a preset request buffer area;
  a request parsing module, configured to parse the current request to be processed, and based on a parsing result, acquire corresponding current source data to be processed and a serial address item for recording an address of a next request to be processed;
  a processing module, configured to process the current source data to be processed to obtain currently processed target data, and write the currently processed target data into a preset data buffer area; and a determination result processing module, configured to notify a host to read all processed target data from the preset data buffer area in response to the serial address item being empty.

In a third aspect, the present application discloses an electronic device, including a memory and one or more processors, the memory storing computer-readable instructions which, when executed by the one or more processors, cause the one or more processors to perform the steps of the disclosed request processing method.

In a fourth aspect, the present application discloses one or more non-volatile computer-readable storage medium storing computer-readable instructions which, when executed by one or more processors, cause the one or more processors to perform the steps of the disclosed request processing method.

The details of one or more embodiments of the present application are set forth in the accompanying drawings and the description below. Other features and advantages of the present application will be apparent from the description, drawings, and claims.

BRIEF DESCRIPTION OF THE DRAWINGS

In order to explain these embodiments of the present application or the technical solutions in the related art more clearly, the following will briefly introduce the drawings which need to be used in the description of these embodiments or the related art. Obviously, the drawings in the description below are merely embodiments of the present application, and for a person skilled in the art, other drawings may also be obtained according to the provided drawings without involving any inventive effort.

DETAILED DESCRIPTION

The technical solutions in these embodiments of the present application will be clearly and completely described below in conjunction with the accompanying drawings in these embodiments of the present application. Obviously, the described embodiments are only some embodiments of the present application, not all embodiments. On the basis of these embodiments in the present application, all the other embodiments obtained by a person skilled in the art without involving any inventive effort fall within the scope of the present application.

Since different accelerator cards use different drive interfaces, in the related art, each computing process requires a host to schedule when multiple acceleration computations are required, undoubtedly increasing the burden of a CPU and reducing the processing efficiency.

Therefore, the present application correspondingly provides a request processing scheme, which can reduce the CPU burden and improve the efficiency of request processing.

Figure 1:
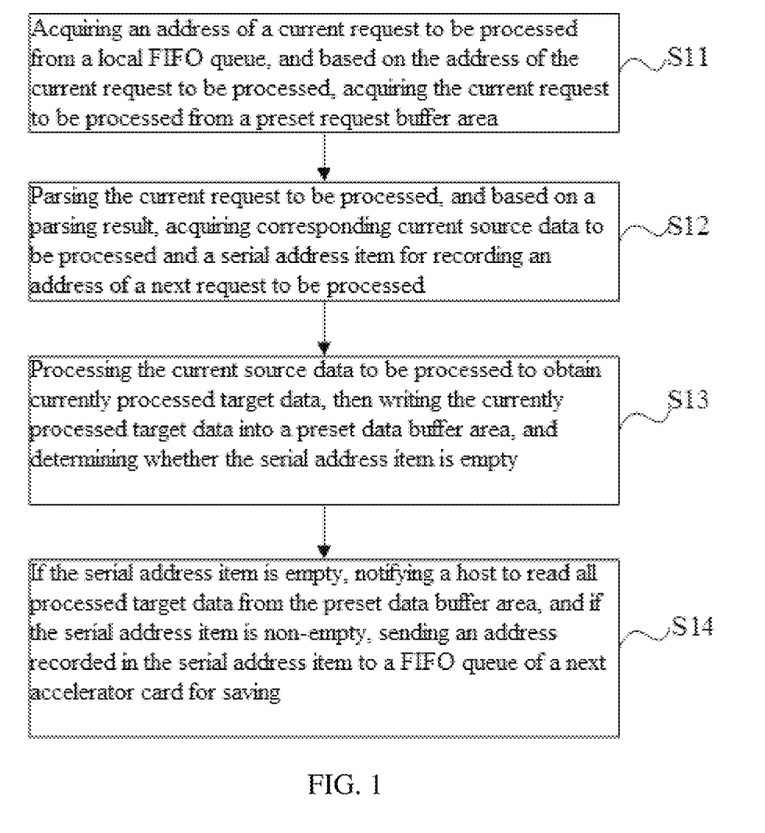
FIG. 1 is a flowchart of a request processing method disclosed in one or more embodiments of the present application.

Referring to FIG. 1, an embodiment of the present application discloses a request processing scheme, applied to a current accelerator card, including the following steps.

At S11, an address of a current request to be processed is acquired from a local FIFO queue, and on the basis of the address of the current request to be processed, the current request to be processed is acquired from a preset request buffer area.

In this embodiment, the address of the current request to be processed is acquired from the local FIFO queue, and the current request to be processed corresponding to the address is acquired from the preset request buffer area. It can be understood that the host prewrites the address of the current request to be processed into the FIFO queue of the current accelerator card.

At S12, the current request to be processed is parsed, and on the basis of a parsing result, corresponding current source data to be processed and a serial address item for recording an address of a next request to be processed are acquired.

In this embodiment, the current request to be processed is parsed to obtain a corresponding parsing result. The parsing result includes an address of processed target data corresponding to a previous processed request, an address of currently processed target data, the serial address item for recording the address of the next request to be processed, a parallel accelerator card address, and a parallel address item for recording a current parallel request to be processed corresponding to the current request to be processed. It can be understood that the corresponding current source data to be processed is acquired from a preset data buffer area on the basis of the address of the processed target data corresponding to the previous processed request.

At S13, the current source data to be processed is processed to obtain the currently processed target data, then the currently processed target data is written into the preset data buffer area, and it is determined whether the serial address item is empty.

In this embodiment, the currently processed target data is obtained after performing corresponding processing on the current source data to be processed and is written into a corresponding position in the preset data buffer area on the basis of an address for storing the currently processed target data. It is determined whether the serial address item is empty, i.e., determining whether there is the next request to be processed. If the serial address item is preset to be empty, there is no next request to be processed, and if the serial address is preset to be 0, there is no next request to be processed. Before corresponding processing is performed on the current source data to be processed, it also needs to determine whether the parallel address item for recording the current parallel request to be processed corresponding to the current request to be processed is empty. It should be noted that if the parallel address item is preset to be empty, there is no current parallel request to be processed, and if the parallel address is preset to be 0, there is no current parallel request to be processed.

In this embodiment, the process of processing the current source data to be processed to obtain the currently processed target data, and writing the currently processed target data into the preset data buffer area further includes: when there is an error in processing the current source data to be processed, writing a corresponding preset error response operation into a response queue pre-allocated for the current accelerator card through the host, and notifying the host to perform the preset error response operation. If an error occurs when the current accelerator card processes the current request to be processed, the current accelerator card writes a corresponding preset error response operation into a local response queue and notifies the host to perform the corresponding preset error response operation through message signaled interrupts (MSIs).

At S14, if the serial address item is empty, the host is notified to read all processed target data from the preset data buffer area, and if the serial address item is non-empty, the address recorded in the serial address item is sent to a FIFO queue of a next accelerator card for saving.

In this embodiment, if the serial address item is empty, it is determined that there is no next request to be processed. Therefore, the current accelerator card writes a preset read response into the local response queue. For example, a phase mark in the response queue is changed from 0 to 1, and then the MSI may be sent to the host to notify the host to read all processed target data from the preset data buffer area. When a phase mark in a host polling response queue is not 0, it is considered that there is a new preset read response written into the response queue, and all processed target data is read from the preset data buffer area, and then the host sets the phase mark from 1 to 0 again so that the next time there is a new preset read response written into the response queue, the phase mark is changed from 0 to 1. If the serial address item is non-empty, the address recorded in the serial address item is sent to the FIFO queue of the next accelerator card for saving so that the next accelerator card acquires the address recorded in the serial address item on the basis of the FIFO queue thereof and acquires the next request to be processed corresponding to the address from the preset request buffer area. It can be understood that a PCIe endpoint (EP, i.e., the accelerator card in the present application) directly sends the address recorded in the serial address item to another PCIe EP and sends same to the next accelerator card, i.e., completing collaborative processing between the current accelerator card and the next accelerator card on the basis of P2P.

It can be seen that in the present application, the address of the current request to be processed is acquired from the local FIFO queue, and on the basis of the address of the current request to be processed, the current request to be processed is acquired from the preset request buffer area. The current request to be processed is parsed, and on the basis of the parsing result, the corresponding current source data to be processed and the serial address item for recording the address of the next request to be processed are acquired. The current source data to be processed is processed to obtain the currently processed target data, then the currently processed target data is written into the preset data buffer area, and it is determined whether the serial address item is empty. If the serial address item is empty, the host is notified to read all processed target data from the preset data buffer area, and if the serial address item is non-empty, the address recorded in the serial address item is sent to the FIFO queue of the next accelerator card for saving. It can be seen that in the present application, the address of the current request to be processed is acquired from the local FIFO queue, and the current request to be processed corresponding to the address is acquired from the preset request buffer area. The current request to be processed is parsed, and on the basis of the parsing result, the corresponding current source data to be processed and the serial address item for recording the address of the next request to be processed are acquired. It is determined whether the serial address item is empty, and if the serial address item is non-empty, the address recorded in the serial address item is sent to the FIFO queue of the next accelerator card for saving, without sending the address recorded in the serial address item to the FIFO queue of the next accelerator card every time by the host, reducing the burden of the CPU, reducing redundant steps, and further improving the request processing efficiency.

Figure 2:
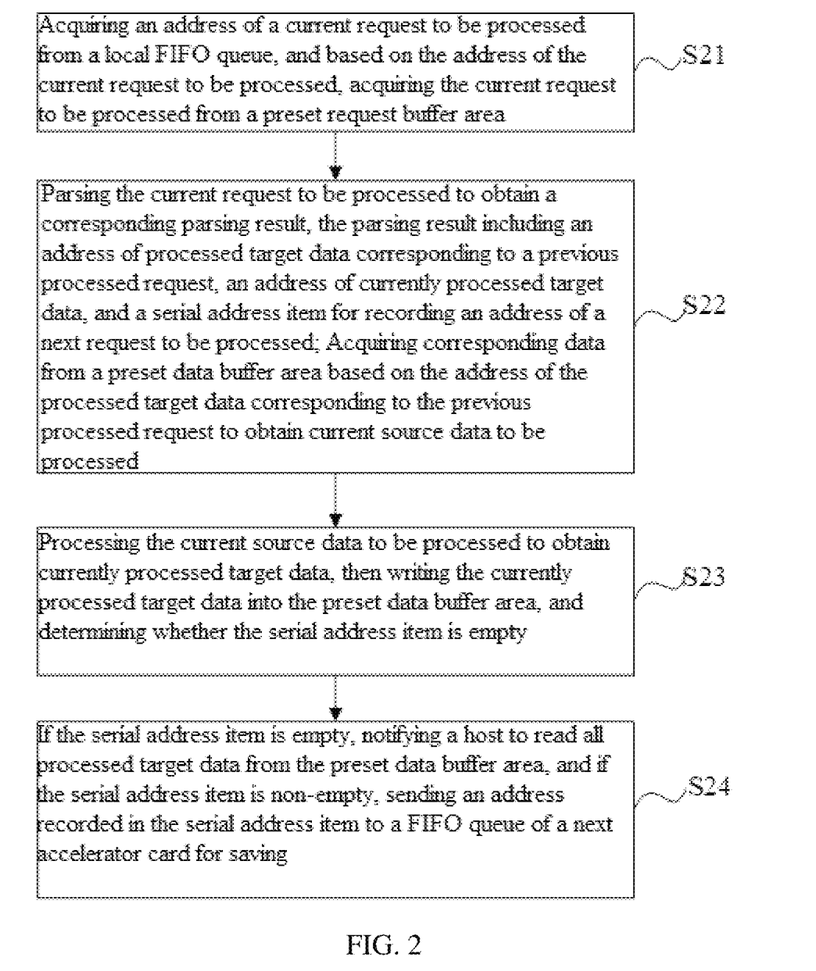
FIG. 2 is a flowchart of a concrete request processing method disclosed in one or more embodiments of the present application.

Referring to FIG. 2, an embodiment of the present application discloses a concrete request processing scheme, including the following steps.

At S21, an address of a current request to be processed is acquired from a local FIFO queue, and on the basis of the address of the current request to be processed, the current request to be processed is acquired from a preset request buffer area.

At S22, the current request to be processed is parsed to obtain a corresponding parsing result, the parsing result including an address of processed target data corresponding to a previous processed request, an address of currently processed target data, and a serial address item for recording an address of a next request to be processed. Corresponding data is acquired from a preset data buffer area on the basis of the address of the processed target data corresponding to the previous processed request to obtain the current source data to be processed.

In this embodiment, the process of parsing the current request to be processed further includes: extracting a serial accelerator card address carried in the current request to be processed. Accordingly, sending the address recorded in the serial address item to the FIFO queue of the next accelerator card for saving includes: determining the next accelerator card on the basis of the serial accelerator card address carried in the current request to be processed, and sending the address recorded in the serial address item to the FIFO queue of the next accelerator card for saving.

Figure 3:
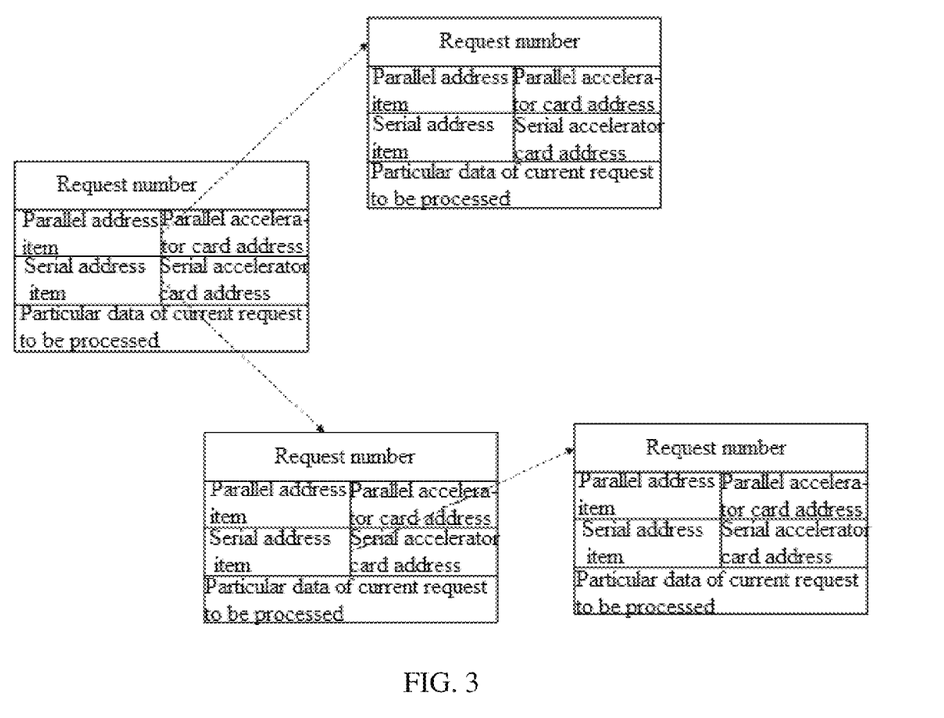
FIG. 3 is a schematic diagram of a concrete request linked list disclosed in one or more embodiments of the present application.

In this embodiment, the process of parsing the current request to be processed further includes: extracting a parallel accelerator card address and a parallel address item carried in the current request to be processed, the parallel address item being used for recording an address of a current parallel request to be processed corresponding to the current request to be processed. Accordingly, before processing the current source data to be processed to obtain the currently processed target data, the method further includes: determining whether the parallel address item is empty, if the parallel address item is non-empty, determining a corresponding target parallel accelerator card on the basis of the parallel accelerator card address carried in the current request to be processed, and sending an address recorded in the parallel address item to the target parallel accelerator card for saving so that the target parallel accelerator card uses the address to acquire the current parallel request to be processed from the preset request buffer area. For example, as shown in FIG. 3, a host prepares data to be processed and creates one or more corresponding requests to be processed according to actual requirements. It can be understood that each request to be processed contains particular data of a current request to be processed, a serial address item for recording an address of a next request to be processed, a serial accelerator card address, a parallel accelerator card address, a parallel address item for recording a current parallel request to be processed corresponding to the current request to be processed, and a request number of the request. The particular data of the current request to be processed contains an address of processed target data corresponding to a previous processed request, an address of currently processed target data, and relevant parameters of the current request to be processed. The parallel accelerator card address and the serial accelerator card address may be base address register (BAR) addresses of the corresponding accelerator card, and since each request contains the serial address item and the parallel address item, a request linked list containing a parallel request linked list and a serial request linked list as shown in FIG. 3 may be formed. It should be noted that addresses of the current request to be processed and the corresponding processed target data corresponding to the previous processed request of the current parallel request to be processed in the parallel request linked list are the same, and request numbers of all requests to be processed in the same request linked list are the same so that the current accelerator card in the request linked list determines the serial address item to be empty and notifies the host to read all processed target data from the preset data buffer area with the request numbers.

At S23, the current source data to be processed is processed to obtain the currently processed target data, then the currently processed target data is written into the preset data buffer area, and it is determined whether the serial address item is empty.

In this embodiment, writing the currently processed target data into the preset data buffer area includes: writing the currently processed target data into a corresponding position of the preset data buffer area on the basis of an address of the currently processed target data carried in the parsing result.

At S24, if the serial address item is empty, the host is notified to read all processed target data from the preset data buffer area, and if the serial address item is non-empty, the address recorded in the serial address item is sent to a FIFO queue of a next accelerator card for saving.

With respect to the more concrete working processes of the above-mentioned S21 and S24, reference may be made to the corresponding contents disclosed in the foregoing embodiments, which will not be described in detail herein.

It can be seen that in the present application, it is not necessary for each step of processing to call different accelerator cards through the host, thereby reducing the burden of the CPU and reducing redundant steps. The current accelerator card writes the parallel address item for recording the current parallel request to be processed corresponding to the current request to be processed into an accelerator card corresponding to the parallel accelerator card address and sends the address recorded in the serial address item to the FIFO queue of the next accelerator card corresponding to the serial accelerator card address for saving. Therefore, collaborative processing may be performed on the request may be processed in parallel or in series, improving the processing efficiency.

Figure 4:
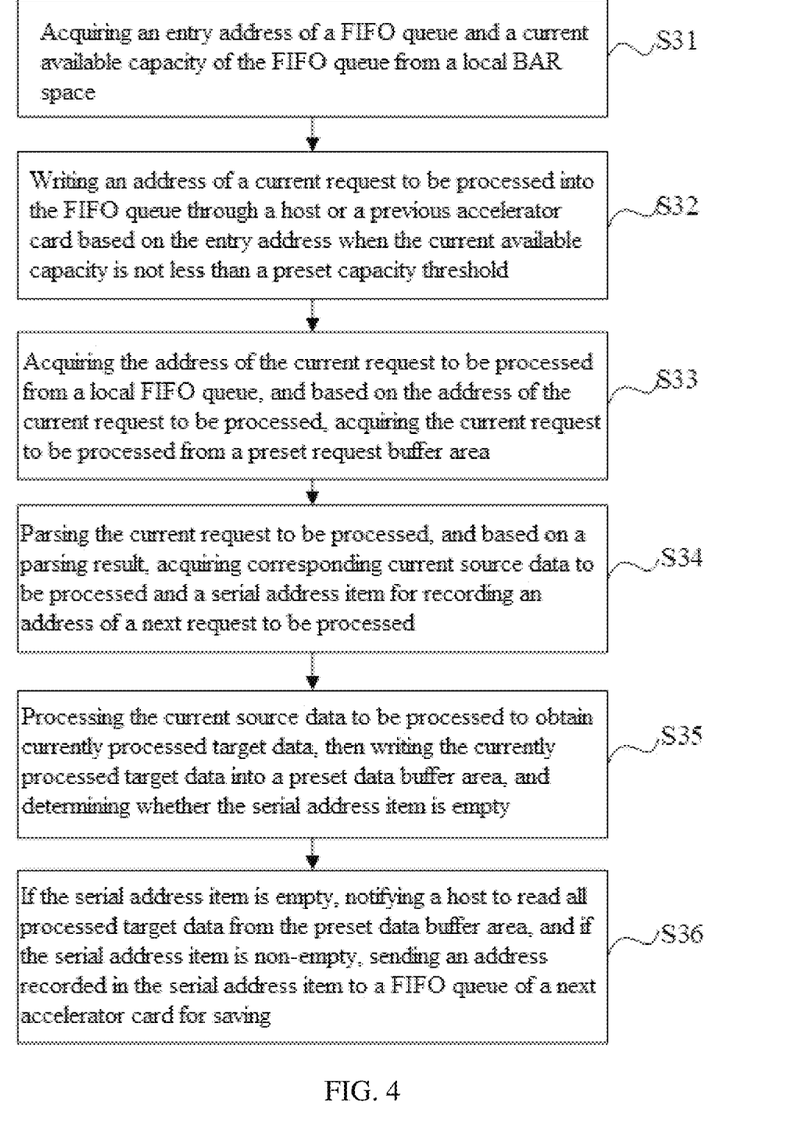
FIG. 4 is a flowchart of a concrete request processing method disclosed in one or more embodiments of the present application.

Referring to FIG. 4, an embodiment of the present application discloses a concrete request processing scheme, including the following steps.

At S31, an entry address of the FIFO queue and a current available capacity of the FIFO queue are acquired from a local BAR space.

In this embodiment, before acquiring the entry address of the FIFO queue and the current available capacity of the FIFO queue from the local BAR space, a host performs system initialization and allocates a preset number of response queues for each accelerator card so that the corresponding accelerator card writes a preset read response into the response queue, and then the MSI may be sent to the host to notify the host to read all processed target data from the preset data buffer area, thereby avoiding data conflicts between multiple accelerator cards. The host applies for a request space for storing the request to be processed from the preset request buffer area and applies for a data space for storing the processed target data from the preset data buffer area.

At S32, the address of the current request to be processed is written into the FIFO queue through the host or the previous accelerator card on the basis of the entry address when the current available capacity is not less than a preset capacity threshold.

In this embodiment, after writing, by the host or the previous accelerator card, the address of the current request to be processed into the FIFO queue on the basis of the entry address when the current available capacity is not less than a preset capacity threshold, the method further includes: recalculating the current available capacity on the basis of a size of a space occupied by the address of the current request to be processed to obtain an updated available capacity, and determining whether the updated available capacity is not less than the preset capacity threshold; prohibiting an address of a new request to be processed from being written into the FIFO queue if the updated available capacity is less than the preset capacity threshold. For example, the current available capacity is 1, and the preset capacity threshold is 1, i.e., the current available capacity is not less than the preset capacity threshold, and the size of the space occupied by the address of the current request to be processed is 1. After writing, by the host, the address of the current request to be processed into the FIFO queue on the basis of the entry address, the current available capacity is recalculated to obtain the updated available capacity being 0, and it is determined that the updated available capacity is less than the preset capacity threshold, thus prohibiting the address of the new request to be processed from being written into the FIFO queue. It can be understood that if the current available capacity is 1 and there are two requests to be processed whose addresses need to be written to the FIFO queue, an arbitration mechanism of the PCIe bus is used, the first request to be processed receives a space allocated to it by the FIFO queue as 1, and the second request to be processed receives a space allocated to it by the FIFO queue as 0. Thus, the address of the first request to be processed is written into the FIFO queue, and the address of the second request to be processed cannot be written into the FIFO queue.

At S33, the address of the current request to be processed is acquired from the local FIFO queue, and on the basis of the address of the current request to be processed, the current request to be processed is acquired from the preset request buffer area.

At S34, the current request to be processed is parsed, and on the basis of a parsing result, corresponding current source data to be processed and a serial address item for recording an address of a next request to be processed are acquired.

At S35, the current source data to be processed is processed to obtain the currently processed target data, then the currently processed target data is written into the preset data buffer area, and it is determined whether the serial address item is empty.

At S36, if the serial address item is empty, the host is notified to read all processed target data from the preset data buffer area, and if the serial address item is non-empty, the address recorded in the serial address item is sent to a FIFO queue of a next accelerator card for saving.

With respect to the more concrete working processes of the above-mentioned S33, S34, S35, and S36, reference may be made to the corresponding contents disclosed in the foregoing embodiments, which will not be described in detail herein.

It can be seen that in the present application, on the basis of the current available capacity of the local FIFO queue, it is determined whether the host or the previous accelerator card can write the address of the current request to be processed into the FIFO queue on the basis of the entry address so as to avoid the case where a FIFO queue overflow error occurs because the current available capacity of the FIFO queue cannot satisfy the size of the space occupied by the address of the current request to be processed. The current accelerator card sends the address of the next request to be processed to the FIFO queue of the next accelerator card to reduce the burden of the host, thereby reducing the workload of the CPU and improving the efficiency of request processing.

Figure 5:
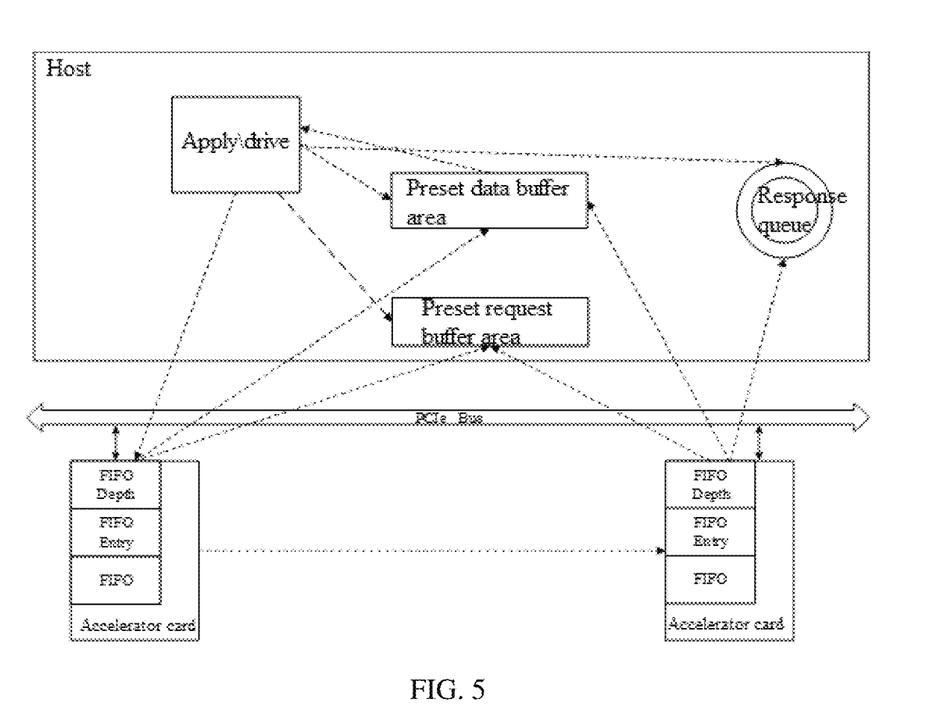
FIG. 5 is a schematic diagram of a concrete request processing method disclosed in one or more embodiments of the present application.

The technical solution of the present application is described below by taking a schematic diagram of a concrete request processing method shown in FIG. 5 as an example. The host performs system initialization and allocates a preset number of response queues to each accelerator card. For example, one ring response queue is allocated for each accelerator card to avoid data conflicts between multiple accelerator cards. The host prepares data to be processed and creates one or more corresponding requests to be processed on the basis of actual requirements. Each request to be processed contains a request number of the request, particular data of a current request to be processed, a serial address item for recording an address of a next request to be processed, a serial accelerator card address, a parallel accelerator card address, and a parallel address item for recording a current parallel request to be processed corresponding to the current request to be processed. The particular data of the current request to be processed contains an address of processed target data corresponding to a previous processed request and an address of currently processed target data. The host acquires a current available capacity of a FIFO queue of an initial accelerator card, and if the current available capacity is not less than a preset capacity threshold, an address of an initial request to be processed is written into the FIFO queue on the basis of an entry address (FIFO entry) of the FIFO queue of the initial accelerator card. The preset capacity threshold may be set as a size of a space occupied by the address of the initial request to be processed and may be changed on the basis of actual situations. If addresses of two requests to be processed needing to be written into the FIFO queue, the first request to be processed and the second request to be processed are determined using an arbitration mechanism of the PCIe bus.

If the current accelerator card detects that the address of the current request to be processed is written in the local FIFO queue, the address of the current request to be processed is acquired from the FIFO queue, and on the basis of the size of the space occupied by the address of the current request to be processed, the current available capacity (FIFO depth) is re-calculated to obtain an updated available capacity. When there is an address of a new request to be processed needing to be written into the FIFO queue, it is determined whether the updated available capacity is less than the preset capacity threshold. If the updated available capacity is less than the preset capacity threshold, the address of the new request to be processed is prohibited from being written into the FIFO queue. It can be understood that if the current accelerator card is the initial accelerator card, the address of the initial request to be processed is acquired. The corresponding current request to be processed is acquired from the preset request buffer area on the basis of the address of the current request to be processed, and the current request to be processed is parsed. Therefore, the parsing result containing the request number of the request, the particular data of the current request to be processed, the serial address item for recording the address of the next request to be processed, the serial accelerator card address, the parallel accelerator card address, and the parallel address item for recording the current parallel request to be processed corresponding to the current request to be processed is acquired. It is determined whether the address recorded by the parallel address item is empty, and if not, the address recorded by the parallel address item is sent to a FIFO queue of a target parallel accelerator card corresponding to the parallel accelerator card address for saving so that the target parallel accelerator card uses the address to acquire the current parallel request to be processed from the preset request buffer area. Corresponding data is acquired from the preset data buffer area using the address of the processed target data corresponding to the previous processed request to obtain the current source data to be processed. The currently processed target data is obtained after processing the current source data to be processed and is written into a corresponding position of the preset data buffer area on the basis of the address of the currently processed target data. When there is an error in processing the current source data to be processed, the corresponding preset error response operation is written into the response queue pre-allocated for the current accelerator card through the host, and the host is notified to perform the preset error response operation.

It is determined whether the serial address item is empty, and if the serial address item is non-empty, the address recorded in the serial address item is sent to the FIFO queue of the next accelerator card corresponding to the serial accelerator card address for saving. If the serial address item is empty, the current accelerator card writes a preset read response to the local response queue so that a phase mark in the response queue is changed from 0 to 1, and then the MSI may be sent to the host to notify the host to read all processed target data from the preset data buffer area.

When a phase mark in a host polling response queue is not 0, it is considered that there is a new preset read response written into the response queue, and all processed target data is read from the preset data buffer area, and then the host sets the phase mark from 1 to 0 again so that the next time there is a new preset read response written into the response queue, the phase mark is changed from 0 to 1.

Figure 6:
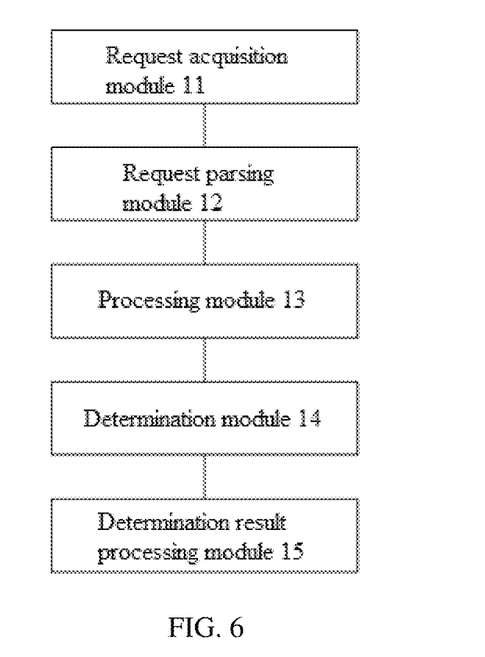
FIG. 6 is a schematic structural diagram of a request processing apparatus disclosed in one or more embodiments of the present application.

Referring to FIG. 6, an embodiment of the present application discloses a request processing apparatus, applied to a current accelerator card, including:

a request acquisition module 11, configured to acquire, from a local FIFO queue, an address of a current request to be processed, and on the basis of the address of the current request to be processed, acquire the current request to be processed from a preset request buffer area;

a request parsing module 12, configured to parse the current request to be processed, and on the basis of a parsing result, acquire corresponding current source data to be processed and a serial address item for recording an address of a next request to be processed;

a processing module 13, configured to process the current source data to be processed to obtain currently processed target data, and write the currently processed target data into a preset data buffer area;

a determination module 14, configured to determine whether a serial address item is empty; and a determination result processing module 15, configured to notify a host to read all processed target data from the preset data buffer area if the serial address item is empty, and send the address recorded in the serial address item to a FIFO queue of a next accelerator card for saving if the serial address item is non-empty.

It can be seen that in the present application, the address of the current request to be processed is acquired from the local FIFO queue, and on the basis of the address of the current request to be processed, the current request to be processed is acquired from the preset request buffer area. The current request to be processed is parsed, and on the basis of the parsing result, the corresponding current source data to be processed and the serial address item for recording the address of the next request to be processed are acquired. The current source data to be processed is processed to obtain the currently processed target data, then the currently processed target data is written into the preset data buffer area, and it is determined whether the serial address item is empty. If the serial address item is empty, the host is notified to read all processed target data from the preset data buffer area, and if the serial address item is non-empty, the address recorded in the serial address item is sent to the FIFO queue of the next accelerator card for saving. It can be seen that in the present application, the address of the current request to be processed is acquired from the local FIFO queue, and the current request to be processed corresponding to the address is acquired from the preset request buffer area. The current request to be processed is parsed, and on the basis of the parsing result, the corresponding current source data to be processed and the serial address item for recording the address of the next request to be processed are acquired. It is determined whether the serial address item is empty, and if the serial address item is non-empty, the address recorded in the serial address item is sent to the FIFO queue of the next accelerator card for saving, without sending the address recorded in the serial address item to the FIFO queue of the next accelerator card every time by the host, reducing the burden of the CPU, reducing redundant steps, and further improving the request processing efficiency.

Figure 7:
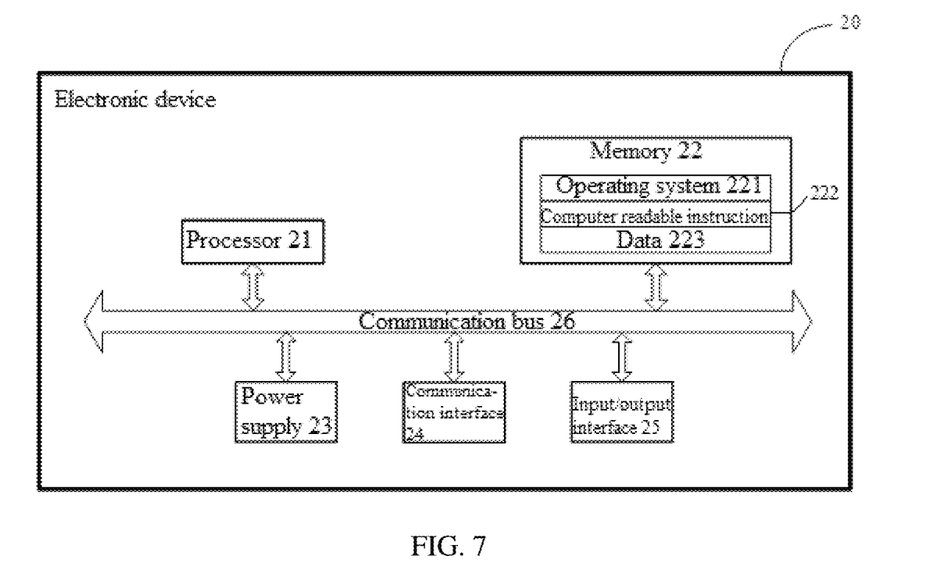
FIG. 7 is a structural diagram of an electronic device disclosed in one or more embodiments of the present application.

FIG. 7 is a schematic structural diagram of an electronic device according to an embodiment of the present application. The electronic device may include at least one processor 21, at least one memory 22, a power supply 23, a communication interface 24, an input/output interface 25, and a communication bus 26. The memory 22 is configured to store computer-readable instructions, and the computer-readable instructions are loaded and executed by the processor 21 to implement the relevant steps in the request processing method performed by the computer device disclosed in any of the foregoing embodiments.

In this embodiment, the power supply 23 is configured to provide working voltages for hardware devices on a computer device 20. The communication interface 24 can create a data transmission channel between the computer device 20 and an external device, and a communication protocol followed thereby is any communication protocol which can be applied to the technical solution of the present application, and is not limited herein. The input/output interface 25 is configured to acquire external input data or output data to the outside, and the interface type thereof may be selected according to specific application requirements, and is not limited herein.

The processor 21 may include one or more processing cores, such as a 4-core processor and an 8-core processor. The processor 21 may be implemented in hardware in the form of at least one of digital signal processing (DSP), FPGA, and programmable logic array (PLA). The processor 21 may also include a main processor and a coprocessor. The main processor is a processor configured to process data in a wake-up state and is also referred to as the CPU. The coprocessor is a low-power processor configured to process data in a standby state. In some embodiments, the processor 21 may be integrated with a graphics processing unit (GPU), and the GPU is responsible for rendering and drawing contents to be displayed on a display screen. In some embodiments, the processor 21 may also include an AI processor, and the AI processor is configured to process computing operations related to machine learning.

In addition, as a carrier for storing resources, the memory 22 may be a read-only memory (ROM), a random access memory (RAM), a magnetic disk, or an optical disk. The resources stored thereon include an operating system 221, computer-readable instructions 222, and data 223, and the storage may be transient storage or non-transitory storage.

The operating system 221 is configured to manage and control various hardware devices on the computer device 20 and computer-readable instructions 222 to enable the processor 21 to operate and process mass data 223 in the memory 22, which may be, such as Windows, Unix, and Linux. The computer-readable instructions 222 may further include computer-readable instructions that can be used for performing other particular tasks in addition to the computer-readable instructions that can be used for performing the request processing method performed by the computer device 20 disclosed in any of the foregoing embodiments. The data 223 may further include data acquired by its own input/output interface 25 in addition to data received by the computer device and transmitted by an external device.

Further, an embodiment of the present application also discloses a non-volatile computer-readable storage medium having stored therein computer-readable instructions which, when executed by one or more processors, perform the method steps disclosed in any of the above-mentioned embodiments as performed in the request processing process.

Finally, it should also be noted that relational terms such as first and second herein are used solely to distinguish one entity or operation from another entity or operation without necessarily requiring or implying any actual such relationship or order between these entities or operations. Moreover, the terms "comprising", "including", or any other variation thereof, are intended to cover a non-exclusive inclusion, such that a process, a method, an article, or a device that includes a list of elements does not include only those elements but may include other elements not expressly listed or inherent to such process, method, article, or device. An element defined by the phrase "comprising a . . . " does not, without more constraints, preclude the existence of additional identical elements in the process, method, article, or device that includes the element.

It will be appreciated by a person skilled in the art that implementing all or part of the flows of the methods of the above-mentioned embodiments may be completed by instructing relevant hardware through the computer-readable instructions, which may be stored on a non-volatile computer-readable storage medium. When executed, the computer-readable instructions may include the flows of the embodiments of the above-mentioned methods. Any references to memory, storage, databases, or other media used in embodiments provided in the present application may include a non-volatile and/or volatile memory. The non-volatile memory may include a ROM, a programmable ROM (PROM), an electrically programmable ROM (EPROM), an electrically erasable programmable ROM (EEPROM), or a flash memory. The volatile memory may include a RAM or an external cache memory. By way of illustration and not limitation, the RAM are available in many forms such as a static RAM (SRAM), a dynamic RAM (DRAM), a synchronous DRAM (SDRAM), a double data rate SDRAM (DDRSDRAM), an enhanced SDRAM (ESDRAM), a synchronous link (Synchlink) DRAM (SLDRAM), a memory bus (Rambus) direct RAM (RDRAM), a direct Rambus dynamic RAM (DRDRAM), and a Rambus dynamic RAM (RDRAM).

The technical features of the above-mentioned embodiments may be combined in any way, and all possible combinations of the technical features of the above-mentioned embodiments have not been described for the sake of conciseness of description. However, as long as there is no contradiction in the combinations of these technical features, they should be considered to be within the scope of this specification.

The above-mentioned embodiments only express several embodiments of the present application, which are described in a more specific and detailed manner, but are not to be construed as a limitation of the scope of the patent application. It should be noted that a person skilled in the art may also make several changes and modifications without departing from the concept of the present application, which falls within the scope of the present application. Therefore, the scope of the patent application shall be governed by the appended claims.

What is claimed is:

1. A request processing method, applied to a current accelerator card, comprising:
  acquiring, from a local first input first output (FIFO) queue, an address of a current request to be processed, and based on the address of the current request to be processed, acquiring the current request to be processed from a preset request buffer area;
  parsing the current request to be processed, and based on a parsing result, acquiring corresponding current source data to be processed and a serial address item for recording an address of a next request to be processed;

processing the current source data to be processed to obtain currently processed target data, writing the currently processed target data into a preset data buffer area, and determining whether the serial address item is empty;

notifying a host to read all processed target data from the preset data buffer area in response to the serial address item being empty, and sending an address recorded in the serial address item to a FIFO queue of a next accelerator card for saving in response to the serial address item being non-empty;

wherein the parsing the current request to be processed, and based on the parsing result, acquiring the corresponding current source data to be processed and the serial address item for recording the address of the next request to be processed comprises:

parsing the current request to be processed to obtain a corresponding parsing result, wherein the parsing result comprises an address of processed target data corresponding to a previous processed request, an address of currently processed target data, and a serial address item for recording an address of a next request to be processed; acquiring corresponding data from the preset data buffer area based on the address of the processed target data corresponding to the previous processed request to obtain the current source data to be processed; and wherein the writing the currently processed target data into the preset data buffer area comprises:

writing the currently processed target data into a corresponding position of the preset data buffer area based on an address of the currently processed target data carried in the parsing result.

2. The request processing method according to claim 1, wherein the parsing result further comprises an address of the currently processed target data, the serial address item for recording the address of the next request to be processed, a parallel accelerator card address, and a parallel address item for recording a current parallel request to be processed corresponding to the current request to be processed.

3. The request processing method according to claim 1, wherein the parsing the current request to be processed further comprises:

extracting a serial accelerator card address carried in the current request to be processed.

4. The request processing method according to claim 3, wherein the sending the address recorded in the serial address item to the FIFO queue of the next accelerator card for saving comprises:

determining the next accelerator card based on the serial accelerator card address carried in the current request to be processed, and sending the address recorded in the serial address item to the FIFO queue of the next accelerator card for saving.

5. The request processing method according to claim 3, wherein the parsing the current request to be processed further comprises:

extracting a parallel accelerator card address and a parallel address item carried in the current request to be processed, the parallel address item being used for recording an address of a current parallel request to be processed corresponding to the current request to be processed.

6. The request processing method according to claim 5, wherein before the processing the current source data to be processed to obtain currently processed target data, the method further comprises:

in response to the parallel address item being non-empty, determining a corresponding target parallel accelerator card based on the parallel accelerator card address carried in the current request to be processed, and sending an address recorded in the parallel address item to the target parallel accelerator card for saving so that the target parallel accelerator card uses the address recorded in the parallel address item to acquire the current parallel request to be processed from the preset request buffer area.

7. The request processing method according to claim 1, wherein before the acquiring, from the local FIFO queue, the address of the current request to be processed, the method further comprises:

acquiring an entry address of the FIFO queue and a current available capacity of the FIFO queue from a local base address register (BAR) space; and writing, by a host or a previous accelerator card, the address of the current request to be processed into the FIFO queue based on the entry address in response to the current available capacity being not less than a preset capacity threshold.

8. The request processing method according to claim 7, wherein after the writing, by the host or the previous accelerator card, the address of the current request to be processed into the FIFO queue based on the entry address in response to the current available capacity being not less than the preset capacity threshold, the method further comprises:

recalculating the current available capacity based on a size of a space occupied by the address of the current request to be processed to obtain an updated available capacity; and prohibiting an address of a new request to be processed from being written into the FIFO queue in response to the updated available capacity being less than the preset capacity threshold.

9. The request processing method according to claim 1, wherein the processing the current source data to be processed to obtain the currently processed target data, and writing the currently processed target data into the preset data buffer area further comprises:

in response to there being an error in processing the current source data to be processed, writing a corresponding preset error response operation into a response queue pre-allocated for the current accelerator card through the host, and notifying the host to perform the preset error response operation.

10. The request processing method according to claim 1, wherein the processing the current source data to be processed to obtain the currently processed target data, and writing the currently processed target data into the preset data buffer area further comprises:

in response to an error occurs during the current accelerator card processing the current request to be processed, the current accelerator card writing a corresponding preset error response operation into a local response queue and notifying the host to perform the corresponding preset error response operation through a message signaled interrupt (MSI) device interruption.

11. The request processing method according to claim 1, wherein before the acquiring, from the local FIFO queue, the address of the current request to be processed, the method comprises:

prewriting, by the host, the address of the current request to be processed into the FIFO queue of the current accelerator card.

12. The request processing method according to claim 1, wherein the serial address item is empty to determine that there is no next request to be processed, and the serial address item is non-empty to determine that there is a next request to be processed.

13. The request processing method according to claim 1, wherein the processing the current source data to be processed to obtain the currently processed target data, and writing the currently processed target data into the preset data buffer area further comprises:
in response to there being an error in processing the current source data to be processed, writing the corresponding preset error response operation into the response queue pre-allocated for the current accelerator card through the host, and notifying the host to perform the preset error response operation.

14. An electronic device, comprising:
a memory storing computer-readable instructions; and
one or more processors configured to execute the computer-readable instructions, wherein upon execution of the computer-readable instructions, the one or more processors is configured
acquire, from a local first input first output (FIFO) queue, an address of a current request to be processed, and based on the address of the current request to be processed, acquire the current request to be processed from a preset request buffer area;
parse the current request to be processed, and based on a parsing result, acquire corresponding current source data to be processed and a serial address item for recording an address of a next request to be processed;
process the current source data to be processed to obtain currently processed target data, write the currently processed target data into a preset data buffer area, and determine whether the serial address item is empty;
notify a host to read all processed target data from the preset data buffer area in response to the serial address item being empty, and send an address recorded in the serial address item to a FIFO queue of a next accelerator card for saving in response to the serial address item being non-empty;
wherein in order to parse the current request to be processed, and based on the parsing result, acquire the corresponding current source data to be processed and the serial address item for recording the address of the next request to be processed, the one or more processors is configured to:
parse the current request to be processed to obtain a corresponding parsing result, wherein the parsing result comprises an address of processed target data corresponding to a previous processed request, an address of currently processed target data, and a serial address item for recording an address of a next request to be processed; acquire corresponding data from the preset data buffer area based on the address of the processed target data corresponding to the previous processed request to obtain the current source data to be processed; and
wherein in order to write the currently processed target data into the preset data buffer area, the one or more processors is configured to:
write the currently processed target data into a corresponding position of the preset data buffer area based on an address of the currently processed target data carried in the parsing result.

15. One or more non-volatile computer-readable storage media storing computer readable instructions, and wherein the computer-readable instructions, upon execution by one or more processors, are configured to cause the one or more processors to:
acquire, from a local first input first output (FIFO) queue, an address of a current request to be processed, and based on the address of the current request to be processed, acquire the current request to be processed from a preset request buffer area;
parse the current request to be processed, and based on a parsing result, acquire corresponding current source data to be processed and a serial address item for recording an address of a next request to be processed;
process the current source data to be processed to obtain currently processed target data, write the currently processed target data into a preset data buffer area, and determine whether the serial address item is empty;
notify a host to read all processed target data from the preset data buffer area in response to the serial address item being empty, and send an address recorded in the serial address item to a FIFO queue of a next accelerator card for saving in response to the serial address item being non-empty;
wherein in order to parse the current request to be processed, and based on the parsing result, acquire the corresponding current source data to be processed and the serial address item for recording the address of the next request to be processed, the computer-readable instructions are configured to cause the one or more processors to:
parse the current request to be processed to obtain a corresponding parsing result, wherein the parsing result comprises an address of processed target data corresponding to a previous processed request, an address of currently processed target data, and a serial address item for recording an address of a next request to be processed; acquire corresponding data from the preset data buffer area based on the address of the processed target data corresponding to the previous processed request to obtain the current source data to be processed; and
wherein in order to write the currently processed target data into the preset data buffer area, the computer-readable instructions are configured to cause the one or more processors to:
write the currently processed target data into a corresponding position of the preset data buffer area based on an address of the currently processed target data carried in the parsing result.

16. The request processing method according to claim 1, wherein the sending the address recorded in the serial address item to the FIFO queue of the next accelerator card for saving in response to the serial address item being non-empty further comprises:
completing collaborative processing between the current accelerator card and the next accelerator card based on Peer-to-Peer (P2P).

17. The electronic device according to claim 14, wherein the parsing result further comprises an address of the currently processed target data, the serial address item for recording the address of the next request to be processed, a parallel accelerator card address, and a parallel address item for recording a current parallel request to be processed corresponding to the current request to be processed.

18. The electronic device according to claim 14, wherein upon execution of the computer-readable instructions, the one or more processors is further configured to:
- extract a serial accelerator card address carried in the current request to be processed.

19. The electronic device according to claim 18, wherein upon execution of the computer-readable instructions, the one or more processors is further configured to:
- determine the next accelerator card based on the serial accelerator card address carried in the current request to be processed, and send the address recorded in the serial address item to the FIFO queue of the next accelerator card for saving.

20. The electronic device according to claim 18, wherein upon execution of the computer-readable instructions, the one or more processors is further configured to:
- extract a parallel accelerator card address and a parallel address item carried in the current request to be processed, the parallel address item being used for recording an address of a current parallel request to be processed corresponding to the current request to be processed.

* * * * *